(3,151,351)

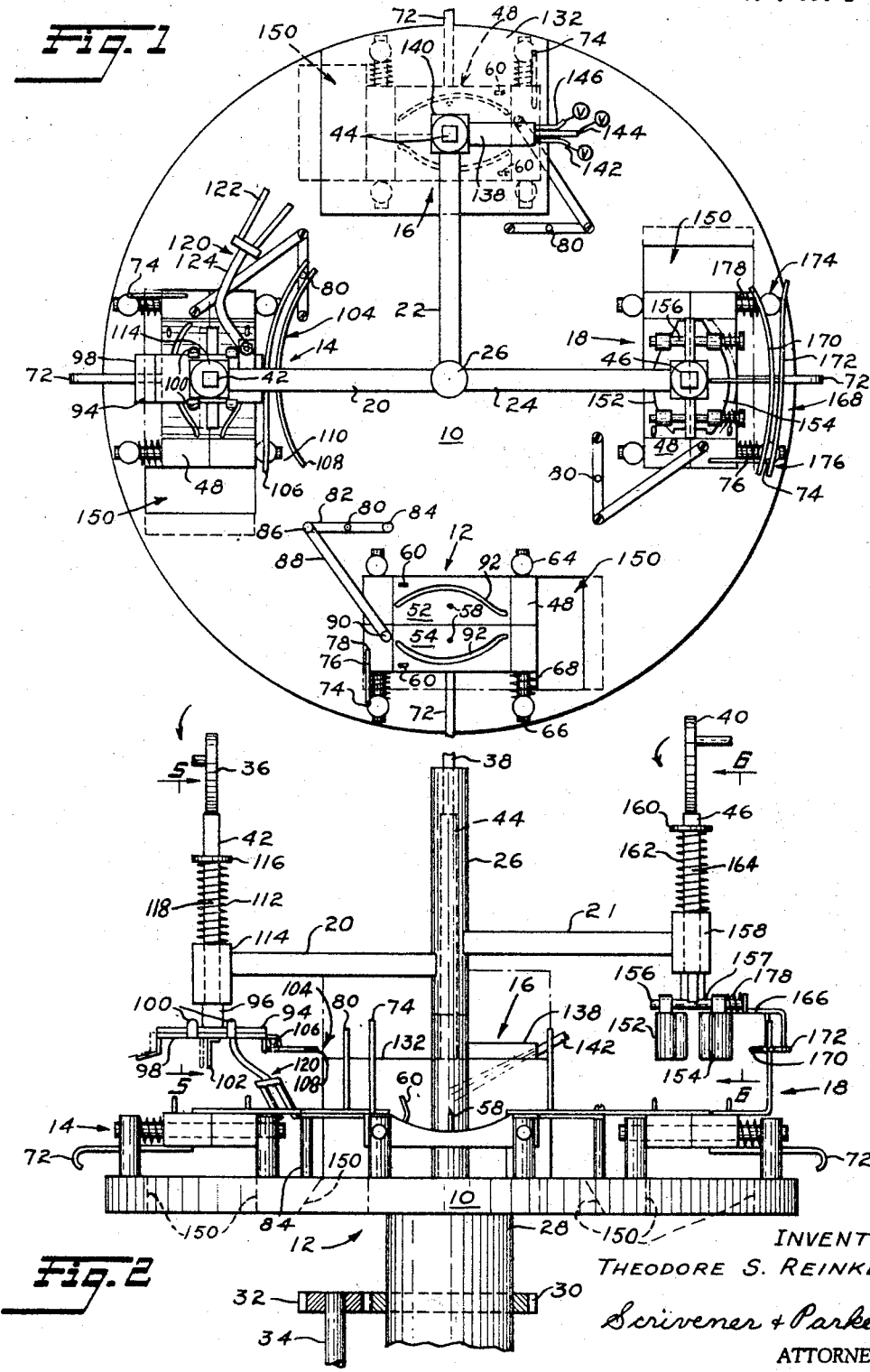

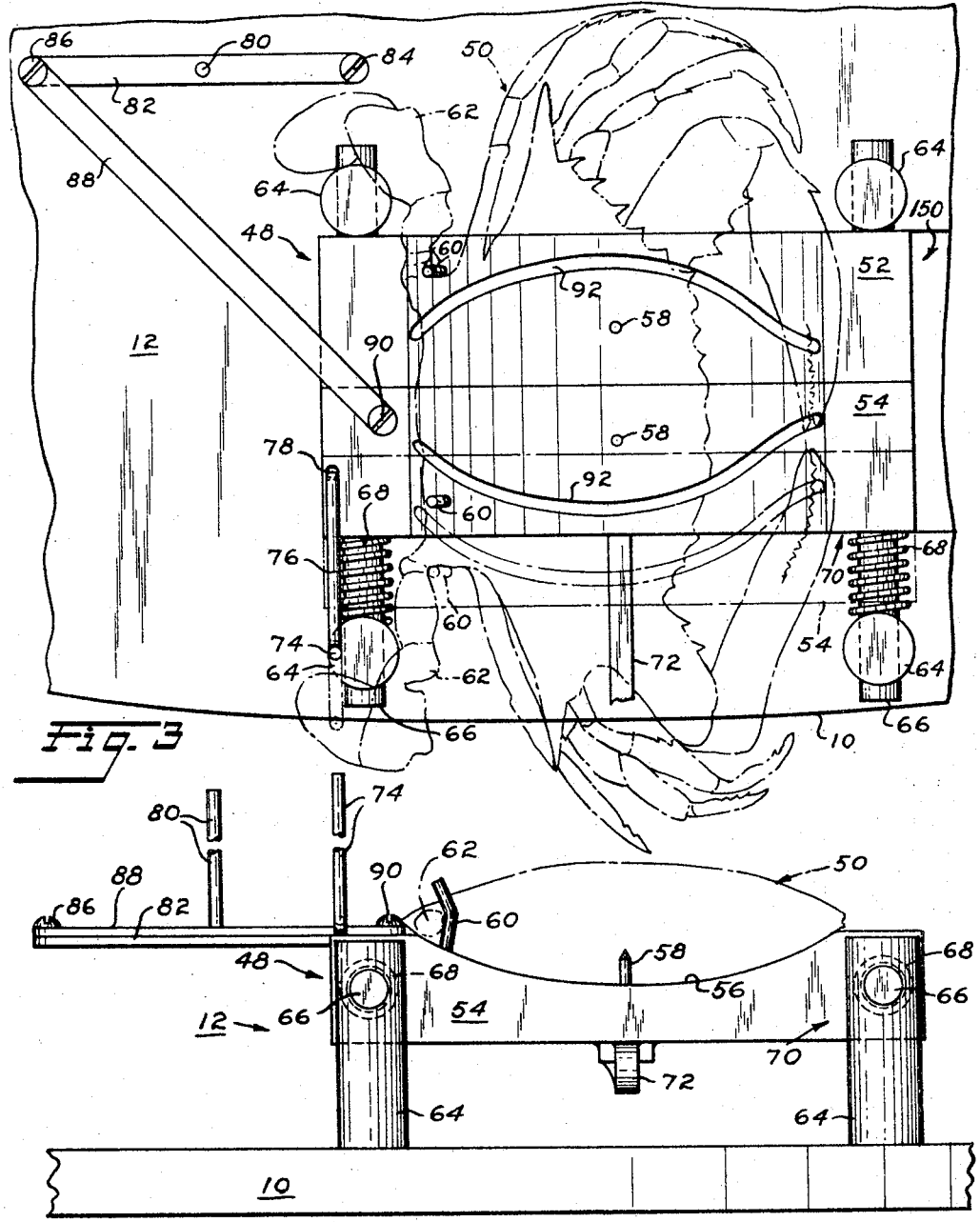

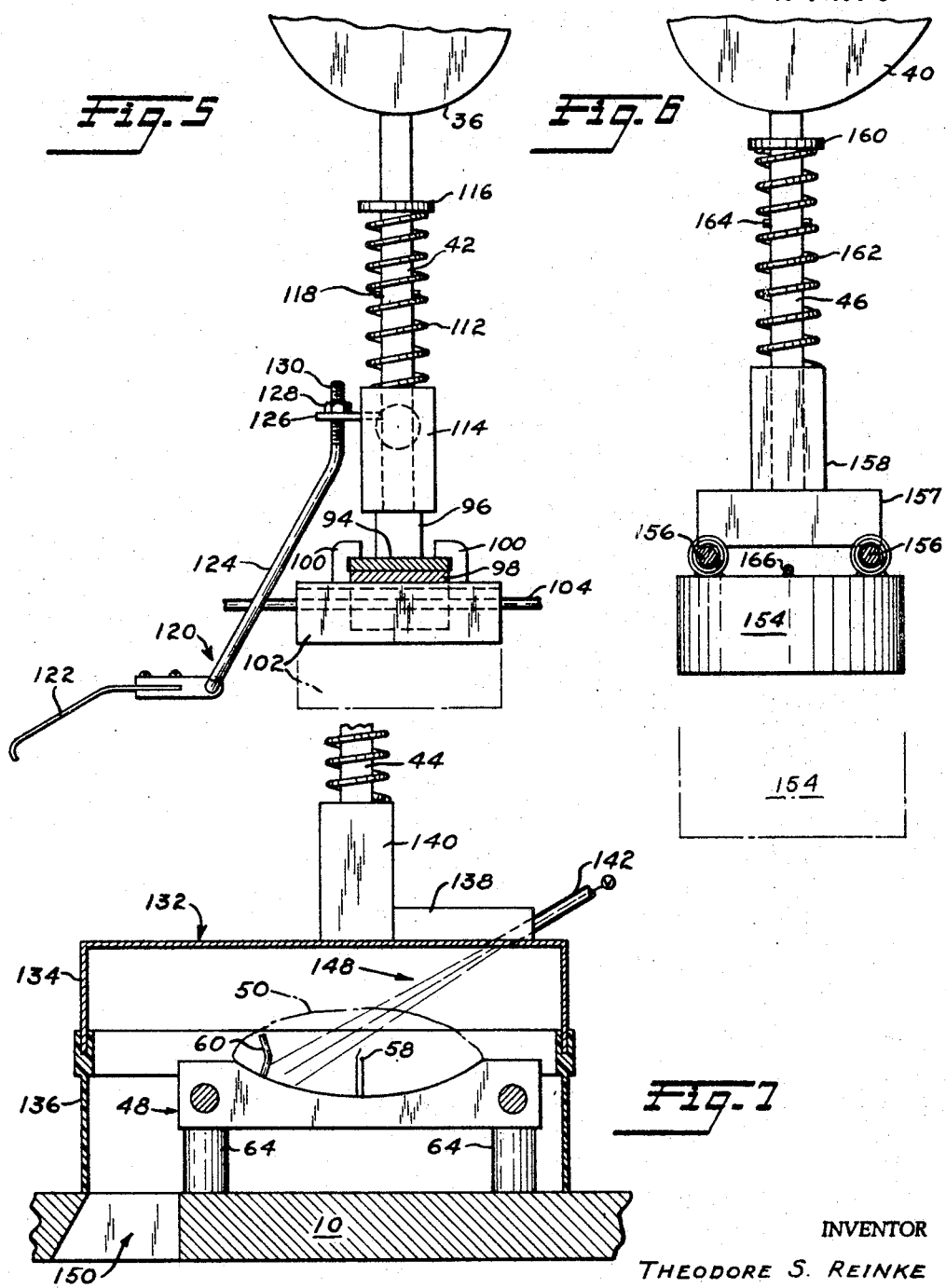

United States Patent Office 3,151,351
Patented Oct. 6, 1964

3,151,351
CRAB PROCESSING MEANS
Theodore S. Reinke, Box 335, Cambridge, Md.
Filed Sept. 20, 1961, Ser. No. 139,387
18 Claims. (Cl. 17—2)

This invention relates to apparatus for processing crabs and more particularly to an apparatus for progressively mounting, shelling, cleaning and coring crabs, whereby ready removal of the crab meat is provided.

Previous attempts have been made to provide satisfactory devices by which the legs and claws can be removed from the crab body and the main meat carrying portion or core separated therefrom to provide ready access to the meat contained therein for its subsequent removal. In the prior art devices no provision is made whereby each crab may be relatively cored in the same way as every other crab. Instead, a circular cut of a standard size or sizes is made on a particular size range of crabs causing a great loss of the meat and a reduction in the profits of the operation. The greatest loss is suffered when the size of the core cut causes a loss of the backfin lump which is the most substantial and desirable concentration of meat on the entire crab.

It is, therefore, a primary object of this invention to provide an apparatus for progressively, in step-by-step sequence, shelling, cleaning and coring crabs wherein the apparatus is universally adjustable to each individual crab processed thereby.

Still another object of this invention is to provide a crab coring means which preserves the entire backfin lump regardless of the size of the crab, as well as the flake meat.

Still another object of the invention is to provide a crab processing apparatus wherein both the carapace and the viscera of the crab are completely removed prior to the coring operation.

These and other objects of the invention will become apparent with reference to the following specification and drawings which relate to a preferred embodiment of the invention.

In the drawings:

FIGURE 1 is a top plan view of the invention;

FIGURE 2 is a side elevation of the invention;

FIGURE 3 is an enlarged top plan view of the crab holding jig of the invention;

FIGURE 4 is a side elevation of the detail of FIGURE 3;

FIGURE 5 is an enlarged side elevation of a cutter and shell stripper of the invention;

FIGURE 6 is an enlarged side elevation of a core cutter of the invention; and

FIGURE 7 is an enlarged side elevation in cross-section of a crab cleaning station of the invention.

Referring in detail to the drawings, and in particular to FIGURE 1, the apparatus of the invention is shown as generally comprising a circular turntable 10 having a loading station 12, shelling station 14, cleaning station 16 and coring station 18 thereon.

All of the stations except for the loading station 12 include apparatus suspended from a plurality of arms 20, 22 and 24 for the stations 14, 16 and 18, respectively, mounted on a fixed vertical supporting post 26 perpendicular to the surface of the turntable 10 and located along its axis of rotation.

As further shown in FIGURE 2, the turntable 10 is mounted on a main shaft 28 having an integral peripheral gear track 30 thereon for engagement with a drive gear 32 mounted on a power shaft 34 adjacent the main shaft 28.

The turntable 10 is also synchronized with an indexed or programmed actuating means (not shown) which automatically controls the actuation of the work stations 14, 16 and 18 by means of a plurality of cams 36, 38 and 40, respectively, which have associated therewith the respective spring biased cam followers 42, 44 and 46. Such indexing or programming means are well known in the art. The patents to Sedgwick, No. 2,557,149, and Kingsbury et al., No. 2,011,487, disclose typical means to index a rotatable member.

The Loading Station

The crab loading station 12 is shown in FIGURES 3 and 4 as comprising an adjustable crab holding jig 48 for holding a crab 50. This holding jig 48 is fixed to the turntable 10 in four positions spaced 90° apart on the turntable 10 whereby all of the other work stations 14, 16 and 18 are provided with a crab holding jig concurrently with the loading station 12.

The holding jig 48 comprises a fixed jaw or plate 52 and a reciprocally adjustable jaw or plate 54, both of which are dished out as shown at 56 in FIGURE 4 to properly receive the contour of the underside of the crab 50 held thereby.

Each of the jaws 52 and 54 is provided with a pair of upstanding pins 58 and 60 which are hereinafter designated as impaling and backfin retaining pins, respectively. The impaling pins 58 consist of sharpened vertically positioned pins located in the lowest portions of the dished out areas 56 of the two jaws 52 and 54. The backfin retaining pins 60 are located near the edge of the dished out portions on the left hand side of the jaws 52 and 54, as shown in FIGS. 3 and 4, and comprise upstanding substantially vertical pins having the upper portions thereof bent slightly in a direction away from the impaling pins 58 whereby the crab 50 is more securely held in position. As shown in FIGURES 3 and 4, the back fins 62 of the crab 50 are wedged beneath the bent portion of the backfin retaining pins 60 and held there by the action of the impaling pins 58.

The two jaws 52 and 54 are mounted above the surface of the table 10 by a plurality of vertical supporting posts or studs 64 in which are mounted a pair of parallel slides or fixed bearing shafts 66. The jaws 52 and 54 are both bored out on both ends thereof to receive the said bearing shafts or slides 66.

The fixed jaw 52 is mounted in juxtaposition or immediately adjacent two of the supporting studs 64 on one end of the slides 66. The adjustable jaw 54 is mounted on the slides 66 between the fixed jaw 54 and the studs 64 at the other end of the slides 66 and is always biased toward the fixed jaw 52 by the action of a pair of coiled compression springs 68 concentric with the slides 66 between the outer end face 70 of the adjustable jaw 54 and the studs 64 at the said other end of the slides 66.

A handgrip 72 is provided on the adjustable jaw 54 whereby the said jaw may be moved away from the fixed jaw 52 against the action of the springs 68 to properly position the impaling and backfin pins 58 and 60 with respect to crabs of different dimensions. Mechanical means may be provided to operate the handgrip 72.

Means automatically moving with the adjustable jaw 54 comprising an upstanding pin or cam actuator 74 having an elongated integral portion 76 substantially parallel to and extending along the slide 66, at that end of the adjustable jaw 54 which carries the backfin pin 60, and then being fixed in the body of the adjustable jaw 54 at a point 78 is provided for a purpose to be hereinafter described.

A second upstanding actuating pin 80 is provided on the holding jig 48 which is automatically positioned by the adjustment of the adjustable jaw 54 to properly receive a crab of a given size in the holding jig 48. The actuating pin 60 is mounted on a driven link 82 which is mounted at one end thereof on a fixed pivot 84 on the turntable 10 and at the other end thereof on a free pivot 86 on one end of a drive link 88. The other end of the drive link 88 is mounted on a fixed pivot 90 on the adjustable jaw 54. The function of the actuating pin 80 will be further described with the shelling station 14.

Each jaw 52 and 54 of the holding jig 48 is provided with a generally arcuate or crescent shaped channel 92 disposed longitudinally of the said jaws. These channels 92 will be further described with the coring station 18.

The Shelling Station

The shelling station 14 where, as the name implies, the upper shell or carapace of the crab is removed is shown in FIGURES 1, 2 and 5.

In the operative position one of the holding jigs 48 with a crab (not shown) thereon is passed beneath the cam 36 and follower 42 on the outer end of the supporting arm 20.

A fixed rectangular plate 94 is integrally attached to the lower end 96 of the cam follower 42. Mounted below the fixed plate 94 is an adjustable plate 98 which is substantially coextensive therewith. The adjustability of the plate 98 is provided by a plurality of substantially hook-shaped slides 100 which are integral with the adjustable plate 98 and extend up and over the longitudinal edges of the fixed plate 94. Both of the plates 94 and 98 have the longitudinal axes thereof disposed parallel to the supporting arm 20 and, therefore, radially with respect to the turntable 10.

Integral with the bottom of the adjustable plate 98 and extending across the short dimension thereof is a straight cutter blade 102. This blade is disposed parallel to the longitudinal axes of the jaws 52 and 54 of the crab holding jig 48 and is adapted, by means to be hereinafter described, to cut the carapace of the crab into two equal halves across the short dimension thereof.

Attached to the inner end of the adjustable plate 98 is an elongated cam track or channel 104 comprising a pair of rods or tubes 106 and 108, bent into a desired camming shape and coextensively positioned in a plane parallel to the surface of the turntable 10. The said rods 106 and 108 are parallel throughout their extent with the exception of a flared portion 110 which comprises the entrance of the cam track or channel 104. The cam track 104 is adapted to receive the upstanding actuating pin 80 which is adjustably positioned concurrently with the adjustable jaw 54 of the crab holding jig 48 at the loading station 12. The action of the actuating pin 80 on the cam track 104 moves the adjustable plate 98 and the cutter blade 102 thereon to a position in which the carapace of the crab carried by the holding jig 48 will be split in equal halves across the short dimension thereof.

The cutter blade 102 is driven downward by the action of the cam follower 42 and the cam 36, in the direction of the arrow as shown in FIGS. 2, 5 and 6. The cam follower 42 is biased upward by a concentric coiled compression spring 112 positioned between an externally concentric collar 114 fixed on the supporting arm 20 at the lower end of the said cam follower and an integral concentric plate 116 intermediate the ends of the said cam follower.

The cam 36 is designed to drive the cutter blade 102 a predetermined distance down through the carapace and into the visceral cavity of the crab positioned on the holding jig 48 to sever the carapace without severing the body of the crab. A safety stop comprising a stop pin 118 positioned between the collar 114 and the integral plate 116 on the said cam follower 42 is also provided to prevent the blade 102 from being driven completely through a crab on the holding jig 48. The pin 118, and the pin 164 hereinafter described, are safety features which act to prevent undue downward movement of the cam followers to which they are attached. These pins in no way interfere with the operation of the cam or cam followers to which they are attached.

A shell stripper 120 comprising a bifurcated spring hook 122 mounted on an arm 124 is connected to a bracket 126 integral with the collar 114 on the supporting arm 20 by a lock nut 128 engaging the threaded end 130 of the said arm 124 of the said shell stripper 120. The spring hook portion 122 of the shell stripper 120 is so positioned as to engage the edge of the carapace after it is split by the cutter blade 102 and tear the split halves thereof from the body of the crab on the holding jig 48. This exposes the visceral cavity of the crab.

The Cleaning Station

The crab cleaning station 16 is shown in FIGURES 1, 2 and 7 as including an elongated housing 132 mounted on the end of the cam follower 44 and being of sufficient size to enclose the entire jaw area of one of the crab holding jigs 48. The housing 132 comprises an upper rigid section 134 with a dependent flexible rubber or plastic skirt 136 or the like which provides a sealing action between the housing 132 and the surface of the turntable 10 for a purpose to be hereinafter described.

Mounted integral with the top of the housing 132 is a mounting block 138 which is adjacent to the externally concentric collar 140 integral with the support arm 22 at the lower end of the cam follower 44. The mounting block 138 is bored out to receive a plurality of pressure tubes or hoses 142, 144 and 146 of which the hoses 142 and 146 carry compressed air or the like and the hose 144 carries water or any other suitable liquid for washing crabs. The bore in the mounting block 138 extends through the top of the housing 132 so that a stream of high velocity liquid and gas 148 as shown in FIGURE 7 will be directed against the exposed viscera in the visceral cavity of the crab 50 on the holding jig 48.

A drain 150 comprising a hole or slot in the turntable 10 adjacent one end of the crab holding jig 48 is provided whereby the wash liquid and the viscera removed thereby from the crab body 50 will be exhausted from the housing 132.

The sources of fluid supply for the pressure hoses 142, 144 and 146 are programmed, as diagrammatically shown in FIG. 1 by the representation of the valves, to be actuated when the cam follower 44 lowers the housing 132 into position over the crab holding jig 48 to impinge the jet 148 of pressurized liquid and gas upon the viscera of the crab 50 in the jig 48.

In certain instances it is desirable to dispense with the fluid cleaning medium and use only an air stream. In such cases, the fluid source may be blocked by means of a valve or other mechanism, not shown, and the stream 148 will be constituted by air above.

The Coring Station

The final operation on the crab 50 after it has progressively passed through the loading station 12, shelling station 14 and cleaning station 16 is performed at the coring station 18, shown in FIGURES 1, 2 and 6, wherein a core is selectively cut from the center of the crab body to remove that portion of the crab containing the backfin lump meat and so-called flake meat from the legs, claws and other parts of the crab body which are elsewhere utilized, or discarded.

As shown in the drawings, the coring station 18 includes a fixed cutter 152 shaped to conform to the arcuate channel 92 in the fixed jaw 52 of the crab holding jig 48 and adjustable cutter 154 mounted for adjustment toward and away from the fixed cutter and shaped to conform to the other arcuate channel 92 in the adjustable jaw 54 of the holding jig 48. Both of the arcuate cutter blades are mounted on a pair of parallel bearing slides 156 which are secured to an integral mounting plate 157 and at the lower end of the spring biased cam follower 46 an externally concentric collar 158 is provided for the lower end of the cam follower 46 integral with the supporting arm 24.

The cam follower 46 includes an integral concentric disk 160 intermediate the ends thereof for retaining a coil spring 162 concentrically mounted on the cam follower 46 between the plate 160 and the said collar 158. An auxiliary stop 164 is also provided between the collar 158 and the plate 160 for the same purpose as that described in conjunction with FIGURE 5. At this station, however, the cutters are designed to pass completely through the crab body and into the arcuate receiving grooves 92 in the jaws 52 and 54 of the crab holding jig 48.

Attached to the upper edge of the adjustable arcuate core-cutter 154 by means of a rod 166 welded or otherwise fastened thereto is an elongated cam track or channel 168 comprising a pair of rods or tubes 170 and 172, bent into a desired camming shape and coextensively positioned in a plane parallel to the surface of the turntable 10. The said rods 170 and 172 are parallel throughout their extent with the exception of a flared portion 174 which comprises the entrance of the cam track or channel 168. The cam track 168 is adapted to receive the upstanding actuating pin 74 which is fixed to the adjustable jaw 54 of the crab holding jig 48, whereby the said pin 74 is adjustably positioned concurrently with the said adjustable jaw 54 to a position peculiar to each individual crab mounted in the holding jig 48. The action of the actuating pin 74 on the cam track 168 first moves the adjustable arcuate core-cutter blade 154 toward or away from the fixed arcuate core-cutter blade 152 whereby the size of the core removed from the crab body on the holding jig 48 will be adjusted for each individual crab.

A second control is effected by the upstanding actuating pin 74 as the turntable 10 rotates and carries the said pin 74 through the cam track 168. The exit end 176 (FIGURE 1) of the cam track 168 is curved so that the pin 74 will force the adjustable core-cutter blade 154 away from the blade 152 and release the core of the crab previously cut thereby and held therebetween. This holding action is provided by a pair of coil springs 178 concentrically disposed on the bearing slides 156 to bias the adjustable core-cutter blade 154 toward the fixed core-cutter blade 152.

*Operation*

Referring generally to FIGURES 1 and 2 and to those figures including the corresponding details to the loading station 12, shelling station 14, cleaning station 16 and coring station 18 as they are described, the operation of the crab processing means of the invention is as follows:

A crab 50, such as shown in FIGURE 3, is first mounted at the loading station 12 by placing one side of the crab 50 on the fixed jaw 52 of the holding jig 48 with the backfin 62 on that side beneath the bent backfin retaining pin 60. The handle 72 on the adjustable jaw 54 of the holding jig 48 is then grasped and pulled radially outward from the turntable 10 against the action of the biasing springs 68 on the bearing slides 66 of the said holding jig 48 until the other backfin pin 60 on the adjustable jaw 54 is in the proper position to engage the other backfin 62 as shown by the dotted line position of the adjustable jaw 54 in FIGURE 3. A downward pressure is then exerted on the carapace of the crab 50 to cause the sharpened impaling pins 58 on the jaws of the holding jig 48 to pierce the crab body and secure the crab 50 on the holding jig 48. The action of the compression springs 68 force the jaws 52 and 54 together and cause the backfin retaining pins 60 to maintain a secure hold on the backfins 62 of the crab 50.

Since the adjustment of the movable jaw 54 of the holding jig 48 is peculiar to each individual crab 50, the first and second actuating pins 74 and 80, connected thereto as hereinbefore described, are likewise moved to a position peculiar to the dimensions of the particular crab 50 in the holding jig 48.

The turntable 10 is driven by the gears 30 and 32 in a programmed manner in a clockwise direction with respect to the showing of FIGURE 1 and thus, intermittently carries each of the four holding jigs 48 shown mounted thereon from station to station as the crab processing operation is progressively carried out.

Once the crab has been secured in the holding jig 48 at the loading station 12 it is carried by the turntable 10 to the shelling station 14.

As the holding jig 48 approaches the station 18, the second actuating pin 80 enters the flared entrance portion 110 of the cam track 104 and drives the cam track and the shell, cutter blade 102 is centered with respect to the longitudinal dimension of the crab 50 and disposed laterally thereof when the holding jig is properly located beneath the said blade 102 and the cam follower 42.

At this point, the cam 36 is actuated by a control means (not shown) to drive the cam follower 42 downward and cause the blade 102 to sever the carapace of the crab.

The turntable 10 is then further rotated to pass the crab beneath the shell stripper 120, whereby the spring hooks 122 thereon engage the leading edge of the split carapace and tear the said carapace from the crab body. This exposes the entire visceral cavity of the crab.

The motion of the turntable continues until the crab 50 and holding jig 48 are positioned beneath the cam follower 44 of the crab cleaning station 16. The cam follower 44 is driven downward through the collar 140 to a position in which the housing 132 encloses the crab 50, holding jig 48 and the drain opening 150 in the turntable 10 and wherein the dependent skirt portion 136 is in contact with the said turntable 10.

The pressurized sources of gas and liquid diagrammatically shown in FIG. 1, are triggered in response to the position of the cam follower 44 to supply the pressure hoses 142, 144 and 146 with gas and liquid, or either one separately, whereby a stream or jet of fluid 148 is impinged upon the visceral cavity of the crab 50 and the viscera are forced out of the crab and exhausted from the housing 132 through the drain port 150.

The turntable 10 is again rotated in a clockwise direction and the crab 50, absent the carapace and viscera, is carried on the holding jig 48 to the final or coring station 18.

As the holding jig 48 enters the coring station 18, the first actuating pin 74 on the movable jaw 54 of the jig enters the flared entrance 174 of the cam track 168 whereby the said cam track 168 and the movable arcuate core-cutter blade 154 are positioned such that the core removed from the crab 50 will be of a relative size proper to the size of the crab on the holding jig 48, whereby the backfin lump meat and flake meat will be properly exposed for removal from the core without waste subsequent to the coring operation.

When the holding jig 48 is properly positioned beneath the cam follower 46 in the coring station 18, the cam 40 is actuated by a means not shown to drive the core-cutter blades 152 and 154 down through the body of the crab 50 and into the cooperating arcuate recesses or channels 92 in the jaws 52 and 54 of the holding jig 48.

After the core has been cut from the crab 50 the core-cutter blades 152 and 154 are allowed to rise by further movement of the cam 40 and carry the core off of the impaling pins 58 on the holding jig 48 and the turntable 10 carries the said jig and the unwanted portions of the crab 50 out from under the core-cutter blades 152 and 154. As the holding jig 48 leaves the coring station, the said first actuating pin 74 thereon engages the exit portion 176 of the cam track 168 which causes the adjustable core-cutter blade 154 to retract from the fixed core-cutter blade 152 against the action of the biasing springs 178, whereby the cut core from the crab 50 is dropped from between the core-cutter blades 152 and 154 back onto the surface of the jig 48 for subsequent removal.

While the foregoing operation has been described by following the progression of a single holding jig 48, it is to be understood that all of the holding jigs 48 shown in FIGURES 1 and 2 are continuously in use and the crabs held therein are simultaneously undergoing one or another of the multiple operations of mounting, shelling, cleaning and coring.

As can be seen from the foregoing description, this invention provides an apparatus for progressively shelling, cleaning and coring crabs wherein the apparatus automatically adjusts each successive operation to the exact specifications and dimensions of each individual crab.

It is to be understood that the embodiment and details thereof shown and described herein are for the purpose of example only and are not intended to limit the scope of the appended claims.

What is claimed is:

1. Means for processing crabs comprising a driven work table, crab holding means on said work table, a plurality of work stations adjacent to said work table, and driving means for said work table for moving said crab holding means thereon successively to each of said work stations, said crab holding means including a plurality of adjustable actuating means relatively positioned thereon with respect to the dimensions of a crab held by said holding means, and means at one or more of said work stations cooperating with said adjustable actuating means on said crab holder to control the operations at said work stations in accordance with the dimensions of a crab held by said crab holder.

2. The invention defined in claim 1, wherein one or more of said work stations include adjustable operating means for operating on a crab held by said holding means and said means cooperating with said adjustable actuating means comprises cam means connected with said adjustable operating means and cooperating with at least one of said actuating means on said crab holding means whereby said adjustable operating means for operating on said crab is automatically positioned with respect to the dimensions of each individual crab.

3. The invention defined in claim 1, wherein said crab holding means comprises a fixed jaw, a movable jaw adjustably mounted with respect to said fixed jaw whereby said jaws may be positioned to the specific dimensions of a crab held thereby and wherein said plurality of adjustable actuating means comprise a plurality of upstanding pins connected with said movable jaw and positioned thereby in accordance with the dimensions of the crab held by said holding means.

4. The invention defined in claim 3, wherein one or more of said work stations include adjustable operating means for operating on a crab held by said holding means and said means cooperating with said adjustable actuating means comprises cam means connected with said adjustable operating means and cooperating with at least one of said plurality of upstanding pins on the said crab holding means whereby said adjustable operating means for operating on said crab is automatically positioned with respect to the dimensions of each individual crab.

5. The invention defined in claim 4, wherein said cam means comprises a pair of elongated coextensive rods, defining a predetermined curved path therebetween, mounted adjacent one another on said adjustable operating means for receiving, in said curved path, one of said upstanding pins on said movable jaw of said crab holder.

6. The invention defined in claim 1, wherein said plurality of work stations comprises a loading station for mounting a crab in said crab holding means, a shelling station for splitting and subsequently removing the carapace of said crab to expose the visceral cavity thereof, a cleaning station for removing the viscera from the said visceral cavity, and a coring station for removing that portion of the crab body containing the backfin lump meat from the remainder of the said crab.

7. The invention defined in claim 1, wherein one of said plurality of work stations is a shelling station comprising an adjustable cutter means for splitting the carapace of a crab held on said crab holder, cam means mounted on said cutter means and engaging one of said adjustable actuating means on said holder, whereby said actuating means moves said cam means and said cutter means to a position wherein the said cutter means will bisect the said carapace as said crab holder progresses through said shelling station, actuating means for said cutter means to drive said cutter means through said carapace, and stripping means mounted at said shelling station to engage the said carapace after it is split by said cutter means to strip the said split carapace from the said crab and expose the visceral cavity thereof.

8. The invention defined in claim 1, wherein one of said plurality of work stations is a cleaning station, said cleaning station being adapted to receive crabs mounted on said crab holder with the carapace of the said crab having previously been removed to expose the visceral cavity of said crab, and comprising a housing, a reciprocating support for said housing, driving means for said support, and fluid pressure means in said housing for emitting a defined jet of fluid into the exposed visceral cavity of said crab, whereby the viscera contained therein is removed.

9. The invention defined in claim 1, wherein one of said plurality of work stations is a coring station, said coring station being adapted to receive a crab mounted on said crab holder with the carapace and viscera of said crab having previously been removed and comprising a fixed cutter, an adjustable cutter adjustably mounted with respect to and cooperating with said fixed cutter, said cutters being shaped to cut a core-shaped section from the body of said crab, cam means mounted on said adjustable cutter blade and engaging one of said adjustable actuating means on said holder, whereby said actuating means moves said cam means and said adjustable cutter blade to a position wherein said cutters are adjusted such that the size of the core cut from said crab by said cutters will be proportional to the size of the crab as said crab holder progresses through said coring station, actuating means for said cutter blades to drive said cutter blades through said crab, and biasing means for biasing said adjustable blade toward said fixed blade to retain said core therebetween after it is cut from said crab, said cam being so shaped immediately prior to disengagement with said actuating means as said holder progresses out of said coring station to move said adjustable blade against the action of said biasing means to release said core from between said cutter blades.

10. A means for processing crabs by progressively subjecting each of a plurality of crabs to a plurality of operations at a corresponding plurality of work stations including an adjustable holding means for each individual crab comprising a fixed jaw and a movable jaw, biasing means for normally holding said movable jaw in juxtaposition with said fixed jaw, means defining adjacent depressions one in the top surface of each of said jaws for receiving a crab body therein, a crab impaling means in each of said depressions and a backfin holding means in each of said depressions adjacent the same end of each of said jaws each adapted to engage the backfin of a crab positioned therein immediately adjacent the body of said crab, means for adjusting said movable jaw away from said fixed jaw whereby the backfin holding means may be properly spaced according to the particular dimensions of each individual crab and first and second adjustable actuating means connected with said moving jaw for controlling certain of said operations at said plurality of work stations, said first means being mounted directly on said movable jaw and said second means being connected to said movable jaw through an adjustable linkage, whereby movement of said movable jaw to compensate for the specific dimensions of a crab in said holder will produce a corresponding movement of said adjustable actuating means to a position peculiar to the said specific dimensions of the said crab in said holder whereby the said certain operations at said work stations will be controlled in accordance with the specific dimensions of each crab being processed.

11. The invention defined in claim 10, wherein one or more of said work stations include adjustable means for operating on a crab held by said holding means and cam means connected with said adjustable means and cooperating with at least one of said actuating means on said crab holding means whereby said adjustable means for operating on said crab is automatically positioned with respect to the dimensions of each individual crab.

12. The invention defined in claim 10, wherein said first and second actuating means comprise upstanding pins.

13. The invention defined in claim 12, wherein one or more of said work stations include adjustable means for operating on a crab held by said holding means and cam means connected with said adjustable means and cooperating with at least one of said plurality of upstanding pins on the said crab holding means whereby said adjustable means for operating on said crab is automatically positioned with respect to the dimensions of each individual crab.

14. The invention defined in claim 13, wherein said cam means comprises a pair of elongated coextensive rods, defining a predetermined curved path therebetween, mounted adjacent one another on said adjustable operating means for receiving, in said curved path, one of said upstanding pins on said movable jaw of said crab holder.

15. The invention defined in claim 10, wherein said plurality of work stations comprises a loading station for mounting a crab in said crab holding means, a shelling station for splitting and subsequently removing the carapace of said crab to expose the visceral cavity thereof, a cleaning station for removing the viscera from the said visceral cavity, and a coring station for removing that portion of the crab body containing the backfin lump meat from the remainder of the said crab.

16. The invention defined in claim 10, wherein one of said plurality of work stations is a shelling station comprising an adjustable cutter means for splitting the carapace of a crab held on said crab holder, cam means mounted on said cutter means and engaging one of said adjustable actuating means on said holder, whereby said actuating means moves said cam means and said cutter means to a position wherein the said cutter means will bisect the said carapace as said crab holder progresses through said shelling station, actuating means for said cutter means to drive said cutter means through said carapace, and stripping means mounted at said shelling station to engage the said carapace after it is split by said cutter means to strip the said split carapace from the said crab and expose the visceral cavity thereof.

17. The invention defined in claim 10, wherein one of said plurality of work stations is a cleaning station, said cleaning station being adapted to receive crabs mounted on said crab holder with the carapace of the said crab having previously been removed to expose the visceral cavity of said crab and comprising a housing, a reciprocating support for said housing, driving means for said support, fluid pressure means in said housing for emitting a defined jet of fluid into the exposed visceral cavity of said crab, whereby the viscera contained therein is removed.

18. The invention defined in claim 10, wherein one of said plurality of work stations is a coring station, said coring station being adapted to receive a crab mounted on said crab holder with the carapace and viscera of said crab having previously been removed and comprising a fixed cutter, an adjustable cutter adjustably mounted with respect to and cooperating with said fixed cutter, said cutters being shaped to cut a core-shaped section from the body of said crab, cam means mounted on said adjustable cutter blade and engaging one of said adjustable actuating means on said holder, whereby said actuating means moves said cam means and said adjustable cutter blade to a position wherein said cutters are adjusted such that the size of the core cut from said crab by said cutters will be proportional to the size of the crab as said crab holder progresses through said coring station, actuating means for said cutter blades to drive said cutter blades through said crab, and biasing means for biasing said adjustable blade toward said fixed blade to retain said core therebetween after it is cut from said crab, said cam being so shaped immediately prior to disengagement with said actuating means as said holder progresses out of said coring station to move said adjustable blade against the action of said biasing means to release said core from between said cutter blades.

References Cited in the file of this patent

UNITED STATES PATENTS

| | | |
|---|---|---|
| 1,459,445 | Elderton et al. | June 19, 1923 |
| 2,502,091 | Harris et al. | Mar. 28, 1950 |
| 2,522,578 | Johnson | Sept. 19, 1950 |
| 2,525,604 | Johnson | Oct. 10, 1950 |
| 2,771,630 | Hiller | Nov. 27, 1956 |
| 2,771,631 | Hiller | Nov. 27, 1956 |
| 2,838,786 | Ward | June 17, 1958 |
| 2,974,356 | Cerny | Mar. 14, 1961 |